United States Patent [19]

Schmitz et al.

[11] Patent Number: 5,713,541
[45] Date of Patent: Feb. 3, 1998

[54] ELECTROMAGNETIC INTERFERENCE DETECTION SYSTEM FOR MASS TRANSIT VEHICLES WITH ELECTRONIC PROPULSION

[75] Inventors: William E. Schmitz, Finleyville; Pierre A. Zuber, Bethel Park; William M. Truman, Venetia; Fred J. Dimasi, Library; Richard P. Ames, Port Matilda, all of Pa.

[73] Assignee: ABB Daimler-Benz Transportation (North America) Inc., Pittsburgh, Pa.

[21] Appl. No.: 776,963
[22] PCT Filed: Jun. 13, 1996
[86] PCT No.: PCT/US96/10279
  § 371 Date: Feb. 13, 1996
  § 102(e) Date: Feb. 13, 1996
[87] PCT Pub. No.: WO96/41728
  PCT Pub. Date: Dec. 27, 1996

Related U.S. Application Data

[63] Continuation of Ser. No. 219, Jun. 13, 1995.
[60] Provisional application No. 60/000,219, Jun. 13, 1996.
[51] Int. Cl.$^6$ ................................................. B60L 15/02
[52] U.S. Cl. ........................... 246/187 A; 246/182 R; 104/300
[58] Field of Search ........................... 246/182 R, 187 A; 104/295, 277, 298, 300; 318/806, 807

[56] References Cited

U.S. PATENT DOCUMENTS

| | | | |
|---|---|---|---|
| 3,634,843 | 1/1972 | Corris | 340/258 |
| 3,776,141 | 12/1973 | Gelhard et al. | 104/123 |
| 4,168,455 | 9/1979 | Soeda et al. | 368/820 |
| 4,202,273 | 5/1980 | Matsui et al. | 104/298 |
| 4,970,458 | 11/1990 | Fox | 324/123 |
| 5,021,725 | 6/1991 | Jimbo et al. | 318/801 |

Primary Examiner—S. Joseph Morano
Attorney, Agent, or Firm—Webb Ziesenheim Bruening Logsdon Orkin & Hanson, P.C.

[57] ABSTRACT

An electric power vehicle includes a propulsion system connected to a direct current (DC) source via a supply line. The propulsion system converts the DC supplied via the supply line to an AC electrical power to operate an AC motor at a desired level. An electromagnetic interference detection system for the vehicle includes an EMI processor connected to a current transducer and the propulsion system. The transducer detects AC signals appearing on the supply line and provides an output to the EMI processor. The EMI processor determines the frequency, amplitude and duration of the detected AC signals and causes the propulsion system to adjust the AC electrical power supplied to the motor as a function thereof.

33 Claims, 3 Drawing Sheets

ELECTROMAGNETIC INTERFERENCE DETECTION SYSTEM FOR MASS TRANSIT VEHICLES WITH ELECTRONIC PROPULSION

BACKGROUND OF THE INVENTION

This application is a 371 of PCT/US96/10279 filed Jun. 13, 1996, which is a continuation of Provisional Application Ser. No. 60/000,219 filed Jun. 13, 1995.

1. Field of the Invention

The present invention relates to mass transit vehicles powered from external sources of electrical power and, more particularly, to systems for detecting electromagnetic interference during the operation of mass transit vehicles.

2. Background Art

An electrically powered mass transit vehicle typically includes a propulsion system connected to a direct current (DC) motor or alternating current (AC) motor for propelling the vehicle on running rails. The propulsion system is often driven by a source of DC electrical power supplied from a remote source via a supply line, such as a power rail or an overhead power line. The DC power is often supplied at a relatively high voltage to minimize power loss associated with resistive drops along the length of the supply line. A return path for the DC electric power is provided via the running rails. It is to be appreciated that the DC electrical power, and more specifically, the DC current, provided to the vehicle via the supply line also flows in the running rails. It is common to use the running rails to also provide AC control signals to track signaling equipment, e.g., wayside aspect lights, associated with the rail or track system. These AC control signals are provided at predetermined frequencies, e.g., 60 Hz and 100 Hz. To provide for operation of the track signaling equipment during operation of the vehicle, these AC control signals are superimposed on DC current in the running rails.

The electric motor of a mass transit vehicle is typically designed for variable speed operation at voltages and currents other than provided by the supply line. To accomplish variable speed operation, it is common to switchably control the power supplied to the motor. To this end, for vehicles equipped with a DC motor, the propulsion system includes a DC-DC converter for converting supplied DC to a DC useable by the motor. Similarly, for vehicles equipped with an AC motor, the propulsion system includes a DC-AC inverter for changing the supplied DC to an AC useable by the motor. In operation, the DC-DC converter or the DC-AC inverter controllably switches power from the supply line to the motor as a function of the desired operating characteristics thereof. Specifically, less power is switched from the supply line to the motor when lower vehicle speeds or motor torque are desired and more power is switched from the supply line when higher vehicle speeds or motor torque are desired. A characteristic of the operation of the DC-DC converter or the DC-AC inverter is that AC electrical noise is often conducted onto the DC current. This conducted noise is often generally referred to as Electromagnetic Interference (EMI). Importantly, EMI may contain frequency components in the range of the AC control signals for the track signaling equipment associated with the vehicle. Accordingly, there are concerns that such EMI may cause unintended operation of or undesirable interference with the track signaling equipment.

To reduce the effect of EMI on the DC current, standard propulsion systems include line filters for absorbing significant line current frequencies produced by the DC-DC converter or the DC-AC inverter and, more specifically, for absorbing line current frequencies in the range of control signals for the track signaling equipment, i.e., 60 Hz and 100 Hz. In this manner, the effect of EMI on the DC current by the operation of the DC-DC converter or DC-AC inverter is reduced.

Line filters are typically designed to provide filtration of noise within certain established levels, e.g., without limitation, amplitude, duration and/or frequency. As a result, noise outside the established levels will not be adequately filtered and will be conducted on the supply line. Moreover, if electrical components, e.g., capacitors, associated with the line filter fail or change value with age, the effective filtration characteristics of the line filter are changed and noise normally filtered thereby appears on the DC current. As discussed above, this is a particular problem where the unfiltered noise has frequency components in common with the track signaling equipment, i.e., 60 Hz and 100 Hz.

It is an object of the present invention to provide a system for detecting undesirable levels of EMI generated by a propulsion system of an electrically powered vehicle, particularly EMI having frequencies corresponding to the frequencies of track control signals, and for initiating corrective action corresponding to the characteristics of the detected EMI.

SUMMARY OF THE INVENTION

Accordingly, we have invented a method of electromagnetic detection and control in an electrically powered vehicle and an electromagnetic detection and control apparatus. In the method, direct current (DC) electrical power supplied to the vehicle via a supply line is converted to a power output at a first level and provided to an electric motor. The supply line is monitored for an alternating current (AC) signal appearing thereon. The amplitude and/or duration of the AC signal is determined and the power output is adjusted as a function of the amplitude and/or duration of the AC signal.

In accordance with our invention, adjusting the power output includes: maintaining the power output to the electric motor at the first level in response to the AC signal being less than a first amplitude for a first interval of time; reducing the power output to the electric motor from the first level to a second level if the AC signal has an amplitude greater than the first amplitude for the first interval of time; and withholding electrical power from the motor if the AC signal has an amplitude greater than a second amplitude, greater than the first amplitude, for the first interval of time. If the AC signal has an amplitude greater than the second amplitude for a second interval of time, greater than the first interval, the vehicle is isolated from the supply line. The isolation of the vehicle from the supply line terminates the conversion of electrical power and the providing thereof to the electric motor.

The method further includes stimulating a current transducer with an alternating current. The stimulating current causes the transducer to produce an output signal which is detected. At least one of the frequency, amplitude and duration of the output signal is determined and power output is provided to the electric motor as a function of the at least one of the frequency, amplitude and duration of the output signal.

The electromagnetic detection and control apparatus includes a means for converting electrical power supplied to the vehicle via a supply line to a selectable power output and a means for providing the power output to an electric motor in the vehicle. A means is provided for monitoring the supply line for an alternating current (AC) signal appearing thereon and for determining one of an amplitude and duration thereof. The apparatus also includes a means for adjusting the power output as a function of at least one of the amplitude and duration of the AC signal.

The apparatus also includes a means for maintaining the power output to the electric motor at a first level in response to the AC signal being less than a first amplitude for a first interval of time; a means for reducing the power output to the electric motor from the first level to a second level in response to the AC signal being greater than the first amplitude for the first interval of time; and a means for withholding the power output from the electric motor in response to the AC signal being greater than a second amplitude for the first interval of time, wherein the second amplitude is greater than the first amplitude. The apparatus further includes a means for isolating the vehicle from the supply line in response to the AC signal being greater than the second amplitude for a second interval of time, wherein the second interval is greater than the first interval.

The apparatus includes means for stimulating a current transducer with an alternating current and a means for detecting an output signal of the transducer in response to the stimulation. A means is provided for determining at least one of a frequency, amplitude and duration of the output signal and for enabling the providing means to provide power output to the electric motor as a function of the at least one of the frequency, amplitude and duration of the output signal.

DETAILED DESCRIPTION OF THE PREFERRED EMBODIMENTS

Figure 1:
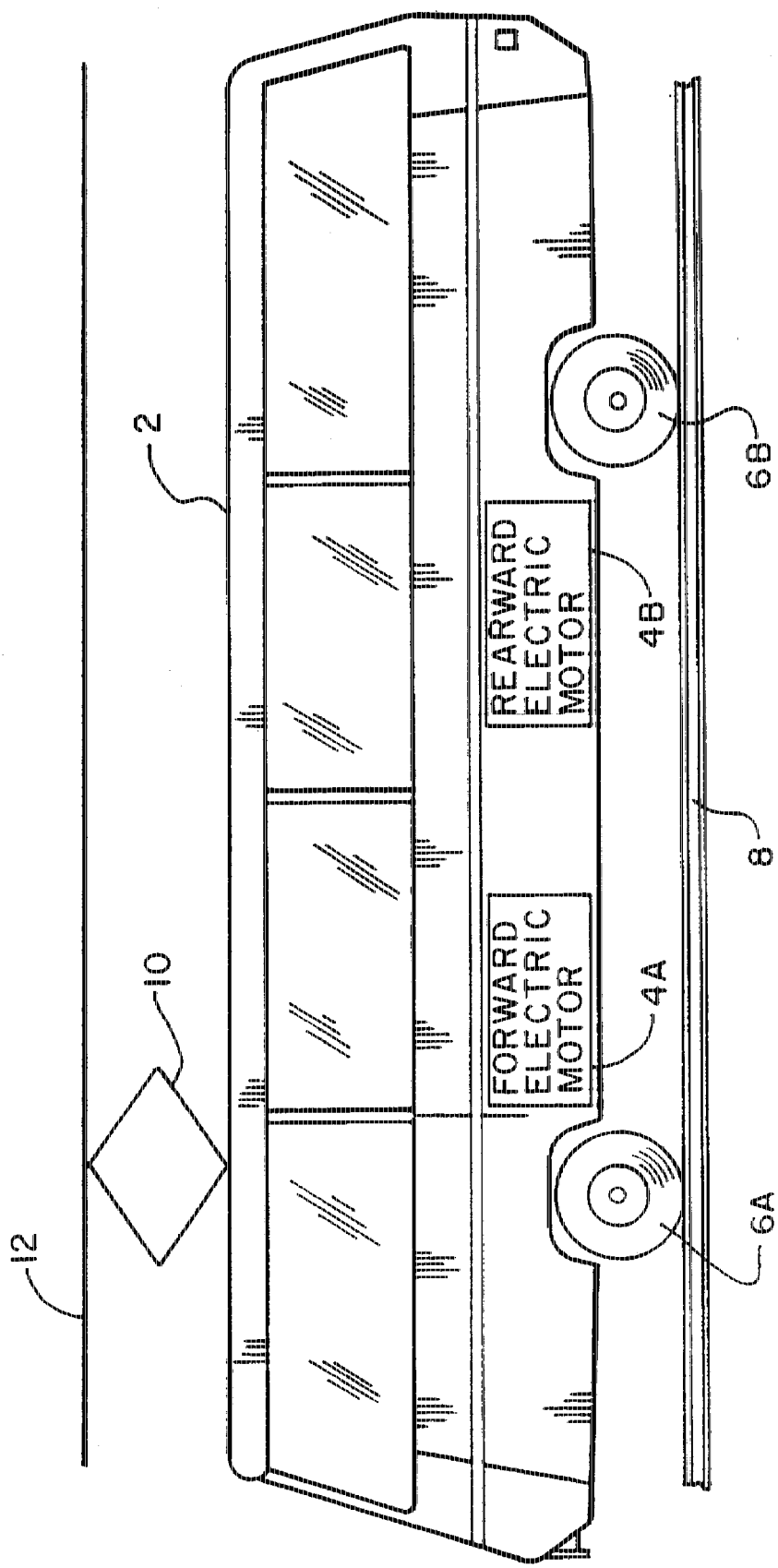
FIG. 1 is a plan view of an electrically powered mass transit vehicle in accordance with the prior art.

With reference to FIG. 1, a prior art electrically powered mass transit vehicle 2 includes a forward disposed alternating current (AC) electric motor 4A and rearward disposed AC motor 4B for providing motive force to front and rear wheels 6A and 6B, respectively, so as to propel vehicle 2 along a running rail 8. It is to be appreciated that the vehicle 2 has front and rear wheels (not shown) disposed on an opposite side thereof and in contact with another rail. The other wheels can have dedicated AC motors for providing motive force thereto or may be powered from AC motors 4A and 4B. For convenience, reference will be made hereinafter to AC motors 4A and 4B providing motive force to wheels 6A and 6B. A pantograph 10 conducts direct current (DC) electric power from a supply line 12 to the vehicle 2. DC electric power conducted by pantograph 10 is converted to AC power, by apparatus to be hereinafter described, provided to AC motors 4A and 4B and returned to ground through contact with the running rail 8. The AC motors 4A and 4B convert the AC power provided thereto to motive force of sufficient extent to propel vehicle 2 along rail 8. The vehicle 2 could alternatively be equipped with DC motors.

Figure 2:
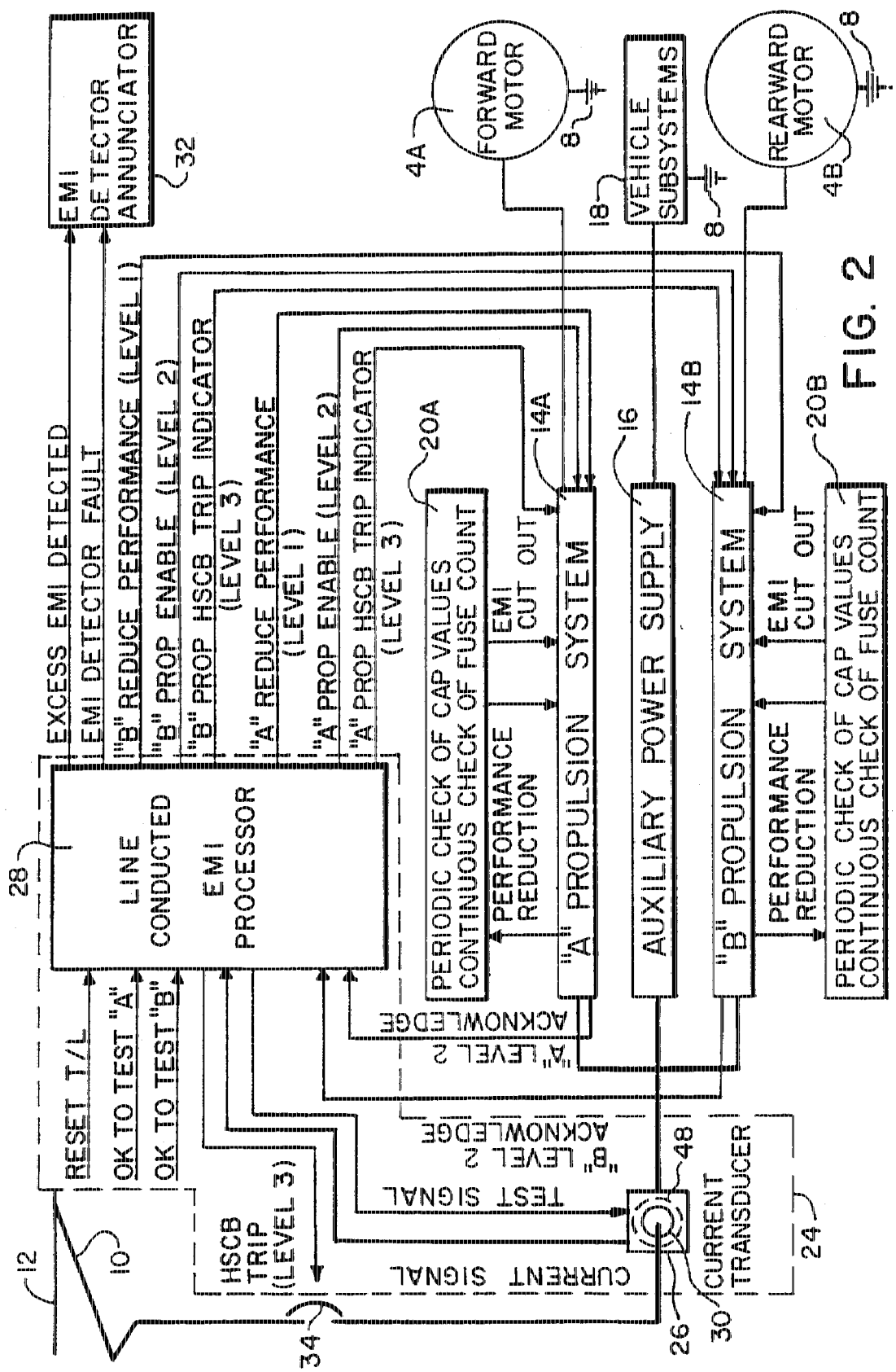
FIG. 2 is a block diagram of an electromagnetic interference detection system of the present invention connected to various systems and subsystems of the vehicle shown in FIG. 1.

With reference to FIG. 2 and continuing reference to FIG. 1, vehicle 2 includes "A" and "B" propulsion systems 14A and 14B having their respective inputs connected to pantograph 10. The outputs of the propulsion systems 14A and 14B are connected to respective AC motors 4A and 4B. The propulsion systems 14A and 14B convert DC electric power supplied thereto to AC electric power useable by AC motors 4A and 4B. For sake of brevity, the propulsion systems 14A and 14B are shown as being connected to respective AC motors 4A and 4B. However, it is to be understood that propulsion systems 14A and 14B are also connected to AC motors associated with the respective front and rear wheels on the opposite side of vehicle 2 for providing power thereto. Thus, in the ensuing description, reference to propulsion system 14A powering AC motor 4A is to be understood as also providing power, in parallel, to the motor associated with the other front wheel. Similar comments apply in respect of propulsion system 14B and the motors associated with the rear wheels of vehicle 2. Vehicle 2 also includes an auxiliary power supply 16 having an input connected to pantograph 10 and an output connected to vehicle subsystems 18, such as air conditioners, fans, lights and the like. The auxiliary power supply 16 converts supplied DC electric power to AC power useable by the vehicle subsystems 18. The propulsion systems 14A and 14B and the auxiliary power supply 16 are grounded to rail 8.

In operation, propulsion systems 14A and 14B controllably switch power from supply line 12 to AC motors 4A and 4B at a level suitable to propel the vehicle 2 at a selectable rate. In the event one of the propulsion systems 14A and 14B is inoperative, however, the vehicle is operable from the remaining propulsion system, albeit at a reduced vehicle performance.

Track signaling equipment is often utilized in conjunction with the vehicle 2 to provide suitable warning and control signals concomitant with the operation thereof. This signaling equipment obtains control signals for the selective operation thereof from the running rails 8. These control signals often take the form of alternating current (AC) signals superimposed on the DC current in the running rails 8 at predetermined amplitudes and frequencies, such as, without limitation, 60 Hz, 100 Hz and audio frequencies, for predetermined intervals. It is well known that the propulsion systems 14A and 14B, switching relatively significant power levels at variable frequencies, produce significant AC noise on the DC current. This AC noise is commonly referred to as Electromagnetic Interference (EMI). Moreover, the auxiliary power supply 16 switching lower power levels at a constant operating frequency also produces EMI on the DC current, albeit to a lesser extent than the propulsion systems 14A and 14B. This EMI often contains components with amplitudes, frequencies and durations in common with the control signals for the track signaling equipment. Because such EMI could potentially interfere with the operation of track signaling equipment, prior art propulsion systems are equipped with input filters, typically an inductor-capacitor circuit, for filtering EMI appearing on the DC current. It is to be appreciated that the input filters may include more than one inductor and more than one capacitor to achieve a desired level of filtration.

The system of the present invention, as shown in FIG. 2, includes a filter verification circuit 20A and 20B connected to a respective propulsion system 14A and 14B for verifying that the capacitor(s) of the input filter in an associated propulsion system will provide a desired level of filtration. In operation, each filter verification circuit measures the time needed to selectively charge and/or discharge the capacitor(s) of the corresponding input filter between desired voltage levels during, for example, a period of vehicle inactivity.

Utilizing the measured charging and/or discharging time, the filter verification circuit calculates if the filter capacitance value is within acceptable limits for filtering EMI below an acceptable noise limit for the output power to be provided by the associated propulsion system. If the filter capacitance value is calculated to be below certain predetermined acceptable limits, the output of the propulsion system is reduced to a level wherein EMI produced thereby is normally below the acceptable EMI noise limit for the actual filter capacitance. If additional capacitors of the input filter fail or change value with age, the output of the propulsion system is reduced accordingly. If the filter verification circuit determines that the actual filter capacitance is below a predetermined lower limit, the filter verification circuit shuts down the associated propulsion system. The filter verification circuit also verifies integrity of one or more fuses associated with one or more capacitors or capacitor banks of the input filter. If the filter verification circuit determines that one or more fuses are open, the filter verification circuit selectively reduces or adjusts the power output of the associated propulsion system so that the output of the propulsion system is reduced to a level wherein EMI produced thereby is normally below the acceptable EMI noise limit for the available filter capacitance. In this manner, the output of the propulsion system is adjusted so that EMI produced thereby will normally be below a limit that could potentially interfere with the operation of track signaling equipment.

The input filter in each propulsion system is designed to provide adequate filtration so that typical levels of EMI produced by the propulsion system do not interfere with the operation of track signaling equipment. Moreover, each filter verification circuit (20A and 20B) is designed to reduce the output of the associated propulsion system as a function of the available filter capacitance. However, the propulsion systems may, under abnormal conditions, produce atypical levels of EMI that would not be adequately filtered by the available filter capacitance to avoid interfering with the operation of the track signaling system. Moreover, partial or complete failure of an input filter during operation of the vehicle could produce EMI which would not be adequately filtered.

Therefore, the present invention includes an EMI detector 24 for detecting EMI exceeding a selected amplitude for a selected duration and for adjusting the output of the propulsion system as a function of the detected EMI. The EMI detector 24 includes a current transducer 26 and an EMI processor 28, which is preferably microprocessor based and software driven. The current transducer 26, such as, without limitation, a transformer, has a means 30 disposed on the vehicle side of pantograph 10 for detecting AC signals, and more specifically EMI, appearing on the DC current. The means for detecting AC signals 30 has an output connected to an input of the EMI processor 28 for providing scaled representations of the detected EMI signals thereto. The EMI processor 28 monitors the scaled signals and measures one or more of the amplitude, frequency and duration of the AC signals on the supply line 12. The EMI processor 28 can measure one or more selected frequencies or a frequency spectrum utilizing, without limitation, Fast Fourier Transform (FFT), a digital filter or other similar techniques. In a preferred embodiment, if the amplitude of the scaled signals have an amplitude less than or equal to a first amplitude at a selected frequency, the EMI processor 28 outputs a condition 0 signal to the propulsion systems 14A and 14B which interpret the same as an indication that the detected EMI is within acceptable limits. Similarly, the EMI processor 28 outputs a condition 0 signal to the propulsion systems 14A and 14B if the scaled signals have an amplitude in excess of the first amplitude at the selected frequency, wherein said amplitude has a duration less than or equal to a first interval of time. In response to receiving the condition 0 signal, the propulsion systems 14A and 14B maintain output power to the motors 4A and 4B at a first level. It is to be appreciated that the first level could be established by an operator of the vehicle 2 or, in an attendantless, automated vehicle, by an intelligent vehicle controller.

If, however, the current transducer 26 detects scaled signals having an amplitude above the first amplitude at the selected frequency, and the first amplitude has a duration in excess of the first interval of time, the EMI processor 28 outputs a condition 1 signal to the propulsion systems 14A and 14B. Moreover, the EMI processor 28 outputs an "Excess EMI Detected" signal to an EMI Detector Annunciator 32. In response to receiving the condition 1 signal, the propulsion systems 14A and 14B reduce the power output to the motors 4A and 4B to a second level that is, for example, 50% of the first level. In response to receiving the Excess EMI Detected signal, the EMI Detector Annunciator 32 provides an audio or visual indication that excessive EMI has been detected. In a preferred embodiment, the AC signals corresponding to the condition 1 signal event do not cause interference with the signaling equipment. In this respect, the condition 1 signal event is selected to avoid having the AC signals increase in amplitude and/or duration to where a condition 2 or 3 signal, described hereinafter, is generated.

Reducing the power output of the propulsion systems 14A and 14B typically reduces the amount of EMI generated thereby. Moreover, restoring the power output of the propulsion systems 14A and 14B after a brief interval of reduced power output often results in EMI levels being within acceptable levels. In a preferred embodiment, the EMI processor 28 automatically recovers, and outputs a condition 0 signal to the propulsion system, in response to detecting, for a predetermined interval of time, scaled signals having at least one of an amplitude, frequency and duration not corresponding to the EMI processor 28 generating a condition 1 signal. Thus, for example, if EMI is, for at least 5 seconds, below an amplitude corresponding to a condition 1 signal event, the EMI processor outputs a condition 0 signal to the propulsion systems 14A and 14B. In response to receiving the condition 0 signal, the propulsion systems 14A and 14B restore the output power to the first level. If restoring the power output to the first level produces EMI levels corresponding to the condition 1 signal event, the EMI processor 28 again outputs a condition 1 signal to the propulsion systems 14A and 14B. The outputting of a condition 1 signal for a predetermined interval followed by condition 0 signal continues until the EMI is within acceptable limits. In this manner, the output of the propulsion systems 14A and 14B are adjusted for temporal occurrences of EMI.

In one embodiment, the frequencies, amplitudes and durations of EMI corresponding to the EMI processor outputting a condition 1 signal are: 60 Hz, I>2.8 amps, t>1.0 second; and 100 Hz, I>0.75 amps, t>1.0 second. The frequencies, amplitudes and durations to be detected by the EMI processor 28 for generating a condition 1 signal, as well as for generating conditions 2 and 3 signals, discussed below, are selected to allow for proper operation of the signaling equipment without interference by EMI generated by the propulsion systems. Similarly, the reduction of output power to 50% of desired output power is intended to reduce EMI noise to an acceptable level but other levels, or even more than one such level, of power reduction could be used.

If current transducer 26 provides scaled signals having an amplitude in excess of a second amplitude, greater than the first amplitude, at the selected frequency, and the second amplitude has a duration in excess of the first interval of time, the EMI processor outputs a condition 2 signal to the propulsion systems 14A and 14B and outputs the Excess EMI Detected signal to the EMI Detector Annunciator 32. In response to receiving the condition 2 signal, the propulsion systems 14A and 14B withhold power from motors 4A and 4B, i.e., the output power is reduced to 0%. In one embodiment, the frequencies, amplitudes and durations of EMI corresponding to the EMI processor 28 outputting a condition 2 signal are: 60 Hz, I>3.7 amps, t>1.0 second; and 100 Hz, I>1.0 amp, t>1.0 second.

In a preferred embodiment, operator intervention is required to recover from a condition 2 signal shutdown of the propulsion systems 14A and 14B. Specifically, a resetting means (not shown) provides the EMI processor 28 and propulsion systems 14A and 14B with a Propulsion Reset Trainline signal (shown in FIG. 2 as "RESET T/L") in response to an operator requested reset of the propulsion systems 14A and 14B in the presence of a brake request at zero vehicle speed. The operator may request up to three operator resets in this manner, whereafter, the propulsion systems 14A and 14B may only be reset by asserting a supervisory reset (not shown).

In response to receiving the condition 2 signal, the propulsion systems 14A and 14B provide the EMI processor 28 with "Level 2 Acknowledge" signals. In the absence of receiving either one or both of the Level 2 Acknowledge signals, the EMI processor 28 outputs a condition 3 signal to the propulsion systems 14A and 14B and outputs a "HSCB Trip" signal to a High Speed Circuit Breaker (HSCB) 34. The HSCB 34 is electrically disposed on the vehicle side of pantograph 10 so that DC electrical power provided to the vehicle 2 from the supply line 12 passes therethrough. In response to receiving the HSCB Trip signal, the HSCB 34 opens and electrically isolates the vehicle 2, and more specifically, the propulsion systems 14A and 14B and the auxiliary power supply 16, from the supply line 12. In this manner, the EMI processor 28 ensures that the propulsion systems 14A and 14B and the auxiliary power supply 16 are eliminated as sources of EMI noise on the supply line 12.

In the present invention, certain EMI levels are regarded as being of sufficient extent to merit immediate electrical isolation of the vehicle 2 from the supply line 12. To this end, if the current transducer 26 provides scaled signals having an amplitude in excess of the second amplitude at the selected frequency, and the second amplitude has a duration in excess of a second interval of time, greater than the first interval of time, the EMI processor 28 outputs the condition 3 signal to the propulsion systems 14A and 14B and outputs the HSCB Trip signal to the HSCB 34. Moreover, the EMI processor 28 outputs the Excess EMI Detected signal to the EMI Detector Annunciator 32. As above, the HSCB 34 opens in response to the HSCB Trip signal, thereby electrically isolating the vehicle 2 from the supply line 12.

The EMI processor 28 outputs a condition 3 signal and an HSCB Trip signal under two circumstances: firstly, if one or both Level 2 Acknowledge signals are not received by the EMI processor 28 in response to outputting a condition 2 signal; and secondly, if scaled signals are detected corresponding to excessive EMI. In one embodiment, the amplitudes, durations and frequencies of EMI corresponding to EMI processor 28 outputting a condition 3 signal under the second circumstance are: 60 Hz, I>3.7 amps, t>1.5 seconds; and 100 Hz, I>1.0 amp, t>1.5 seconds.

Operator intervention is required to reset the HSCB 34 and the propulsion systems 14A and 14B after receiving the respective HSCB Trip signal and the condition 3 signal. In response to an operator requested reset in the presence of a brake request at zero vehicle speed, the resetting means (not shown) provides the EMI processor 28 and propulsion systems 14A and 14B with the Propulsion Reset Trainline signal. In response to receiving the Propulsion Reset Trainline signal, propulsion systems 14A and 14B and the HSCB 34 reset. The operator may request up to three resets in this manner, whereafter, the propulsion systems 14A and 14B and the HSCB 34 may be reset only by asserting a supervisory reset.

Figure 3:
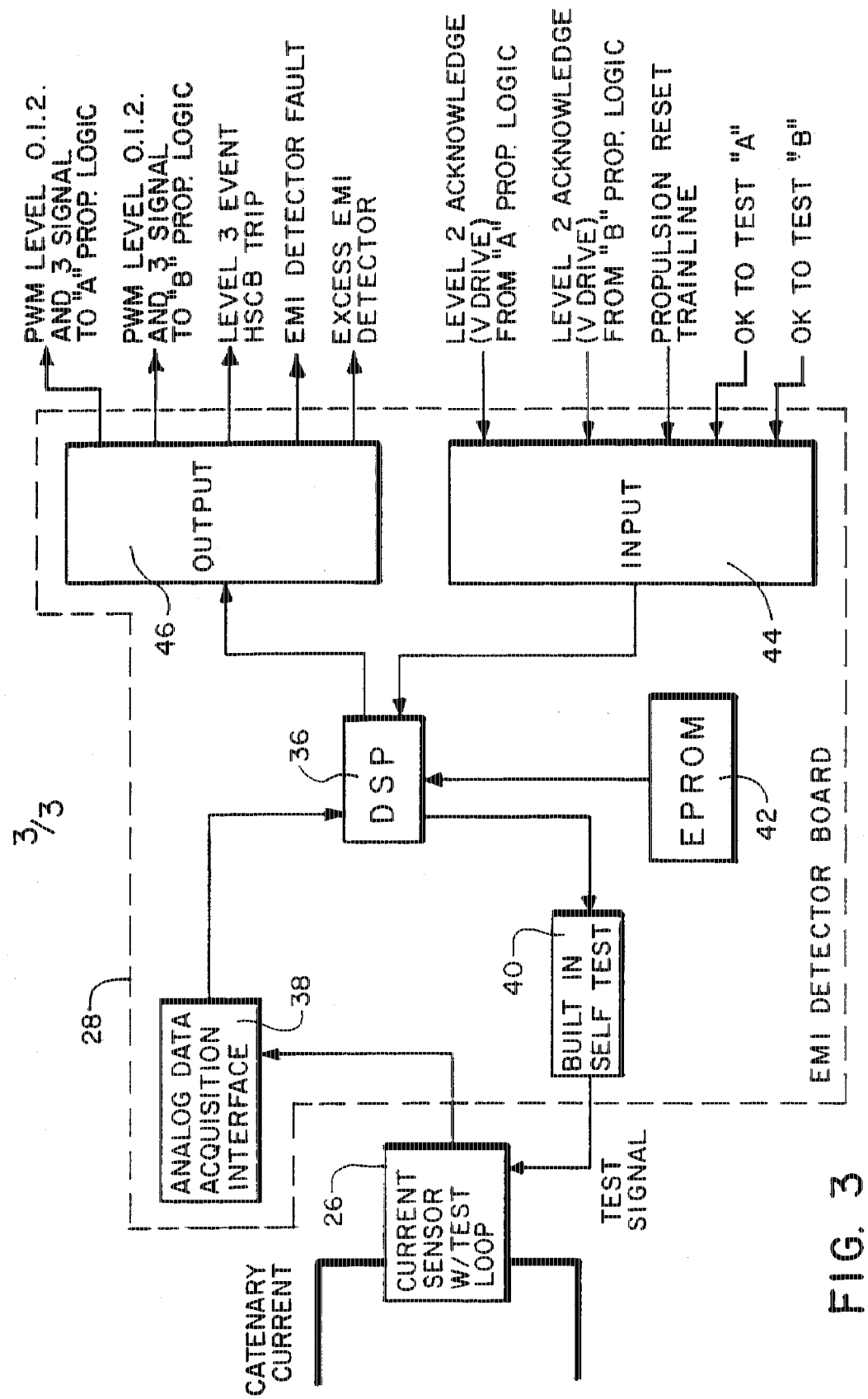
FIG. 3 is a block diagram of the EMI processor shown in FIG. 2.

With reference to FIG. 3 and continuing reference to FIG. 2, the EMI processor 28 includes a software driven digital signal processor (DSP) 36, an analog data acquisition interface 38, a self test circuit 40, a memory system such as an EPROM 42, an input buffer 44 and an output buffer 46. The analog data acquisition interface 38 connects the output of the means for detecting AC signals 30 of the current transducer 26 to the DSP 36 and provides for conversion of analog data from the current transducer 26 to a digital equivalent useable by the DSP 36. The DSP 36, under the control of software stored in the EPROM 42, receives digital output from the analog data acquisition interface 38; provides control signals to the self test circuit 40 for testing the operation of the current transducer 26, in a manner to be described in greater detail hereinafter; receives digital input from the propulsion systems 14A and 14B and other vehicle subsystems through input buffer 44; and provides digital output to the propulsion systems 14A and 14B, the HSCB 34 and other vehicle subsystems through the output buffer 46.

In accordance with the present invention, current transducer 26 includes a test winding 48, shown in phantom in FIG. 2, connected to the self test circuit 40. In a test mode of operation, the DSP 36 causes the self test circuit 40 to energize the test winding 48 sufficiently to cause the means for detecting AC signals 30 of the current transducer 26 to experience AC noise of sufficient extent to cause the DSP 36 to detect scaled signals having, for example, an amplitude in excess of the second amplitude for a duration in excess of the first interval of time, i.e., a condition 2 signal event. If, in response to energization of the test winding, signals having sufficient amplitude for a sufficient duration are not detected, the EMI processor 28 outputs a condition 2 signal to the propulsion systems 14A and 14B and outputs the EMI detector fault signal to EMI Detector Annunciator 32. In response to receiving the condition 2 signal, the propulsion systems 14A and 14B are rendered inoperative until reset as described above. If, however, the DSP 36 detects scaled signals corresponding to a condition 2 signal event, the EMI detector 24 is determined to be operational and a condition 0 signal is output to the propulsion systems 14A and 14B. In this manner, the operation of the EMI detector 24 can be verified.

The present invention has been described above in conjunction with the detection of AC signals at a predetermined frequency. It is to be appreciated, however, that two or more predetermined frequencies could be detected. Moreover, AC signals operating over one or more frequency spectrums could also be detected using appropriate digital filtering techniques, such as FFT. Accordingly, the use above of a predetermined frequency to describe the operation of the present invention is not to be construed as limiting the invention. Furthermore, the individual frequencies or band of frequencies comprising the AC noise to be detected by the EMI detector could reside anywhere in a frequency spectrum wherein such AC noise is conductible onto the DC current. In this respect, the EMI detector of the present invention is configurable to detect, without limitation, AC noise at one or more predetermined frequencies and/or AC noise over one or more continuous frequency bands or ranges at the same time. In the present invention, the frequencies or frequency bands to be monitored are adjustable by changing an EPROM, or by downloading new parameters or software into a RAM within the DSP.

The above invention has been described with reference to currently preferred embodiments. Other modifications and alterations can be made and yet still come within the scope of the present invention. For example, certain characteristics of the EMI detector 24, such as, without limitation, frequency, amplitude, duration, response time, recovery criteria, and the like, are adjustable by component substitution and/or software changes. The EMI detector 24 could be hardware and/or software modified to detect broadband AC signals and to respond thereto in the manner set forth above. The output power of the propulsion systems 14A and 14B could be independently adjusted to reduce EMI on the supply line 12. The EMI processor 28 could determine whether one of the propulsion systems 14A and 14B was a primary cause of EMI and selectively adjust the output power on that propulsion system to reduce the total EMI on the supply line 12 within acceptable levels, yet make no adjustment to the operation of the other propulsion system. It is intended that the invention be construed as including all such modifications and alterations insofar as they come within the scope of the appended claims or the equivalents thereof.

What is claimed is:

1. A method of electromagnetic interference detection and control in an electrically powered vehicle, said method comprising the steps of:

converting direct current (DC) electrical power supplied to the vehicle to a power output at a first level;

providing the power output to an electric motor in the vehicle;

monitoring the DC electrical power for an alternating current (AC) signal appearing thereon;

determining at least one of an amplitude and duration of the AC signal; and adjusting the power output as a function of the at least one of the amplitude and duration of the AC signal.

2. The method as set forth in claim 1 wherein said adjusting step includes the steps of:

maintaining the power output to the electric motor at the first level in response to the AC signal being less than a first amplitude for a first interval of time;

reducing the power output to the electric motor from the first level to a second level in response to the AC signal being greater than the first amplitude for the first interval of time; and withholding the power output from the electric motor in response to the AC signal being greater than a second amplitude for the first interval of time, wherein the second amplitude is greater than the first amplitude.

3. The method as set forth in claim 2 wherein the maintaining step includes maintaining the output power to the motor at the first level in response to the AC signal being greater than the first amplitude but for less than the first interval of time.

4. The method as set forth in claim 2 wherein said adjusting step includes the step of:

isolating the vehicle from the supply of DC electrical power in response to the AC signal being greater than the second amplitude for a second interval of time, wherein the second interval is greater than the first interval.

5. The method as set forth in claim 4 wherein said isolating step stops the operation of one of the converting step and the providing step.

6. The method as set forth in claim 1 wherein the frequency of the AC signal monitored matches a frequency of a control signal for track signaling equipment used in connection with said vehicle.

7. The method as set forth in claim 1 wherein the frequency of the AC signal monitored is at least one of 60 Hz, 100 Hz and a frequency within the audio spectrum.

8. A method as set forth in claim 1 further comprising the steps of:

stimulating a current transducer with an alternating current;

detecting an output signal of the transducer in response to the stimulation;

determining at least one of a frequency, amplitude and duration of the output signal; and providing power output to the electric motor as a function of the at least one of the frequency, amplitude and duration of the output signal.

9. The method as set forth in claim 8 wherein the power output is provided to the electric motor if the amplitude and duration of the output signal at a selected frequency is greater than a reference amplitude and duration at the selected frequency.

10. An apparatus for electromagnetic detection and control in an electrically powered vehicle, said apparatus comprising:

means for converting direct current (DC) electrical power supplied to the vehicle to a power output at a first level;

means for providing the power output to an electric motor in the vehicle;

means for monitoring the DC electrical power for an alternating current (AC) signal appearing thereon;

means for determining at least one of an amplitude and duration of the AC signal; and means for adjusting the power output as a function of the at least one of the amplitude and duration of the AC signal.

11. The apparatus as set forth in claim 10 further including:

means for maintaining the power output to the electric motor at the first level in response to the AC signal being less than a first amplitude for a first interval of time;

means for reducing the power output to the electric motor from the first level to a second level in response to the AC signal being greater than the first amplitude for the first interval of time; and means for withholding the power output from the electric motor in response to the AC signal being greater than a second amplitude for the first interval of time, wherein the second amplitude is greater than the first amplitude.

12. The apparatus as set forth in claim 11 wherein the maintaining means maintains the output power to the motor at the first level in response to the AC signal being greater than the first amplitude but for less than the first interval of time.

13. The apparatus as set forth in claim 12 further including means for isolating the vehicle from the supply line in response to the AC signal being greater than the second amplitude for a second interval of time, wherein the second interval is greater than the first interval.

14. The apparatus as set forth in claim 13 wherein the isolating means isolates one of the converting means and the providing means from the supply of DC electrical power.

15. The apparatus as set forth in claim 10 further including:
- means for stimulating a current transducer with an alternating current;
- means for detecting an output signal of the transducer in response to said stimulation;
- means for determining at least one of a frequency, amplitude and duration of the output signal; and
- means for enabling the providing means to provide power output to the electric motor as a function of the at least one of the frequency, amplitude and duration of the output signal.

16. The apparatus as set forth in claim 10, further including:
- means for determining a value of filter capacitance of an input filter of the means for converting; and
- means for selectively adjusting the power output as a function of the value of the filter capacitance.

17. The apparatus as set forth in claim 10, further including:
- means for verifying the integrity of a fuse associated with one or more capacitors of an input filter of the means for converting; and
- means for selectively adjusting the power output as a function of the integrity of the fuse.

18. An electromagnetic interference detection and control apparatus for use with a mass transit vehicle having an electric motor for providing motive force to the vehicle and a propulsion system for converting electrical power supplied to the vehicle via a supply line to an electrical power useable by the motor, wherein the propulsion system supplies the converted electrical power to the motor at a first level, said apparatus comprising:
- a current transducer for detecting AC current on the supply line and for providing an output signal related thereto; and
- an EMI processor receiving the output signal of the current transducer and connected to the propulsion system for analyzing the detected AC current over a first interval of time and for causing the electrical power supplied to the motor by the propulsion system to be adjusted as a function thereof.

19. The apparatus as set forth in claim 18 wherein the EMI processor signals the propulsion system to maintain the electrical power supplied to the motor by the propulsion system at the first level in response to the detected AC current being less than a first amplitude.

20. The apparatus as set forth in claim 18 wherein the EMI processor reduces the electrical power supplied to the motor by the propulsion system from the first level to a second level in response to the detected AC current exceeding a first amplitude for said first interval of time.

21. The apparatus as set forth in claim 20 wherein the EMI processor restores electrical power to the motor to the first level in response to the AC current falling below the first amplitude for a predetermined interval of time.

22. The apparatus as set forth in claim 18 wherein the EMI processor generates a signal that causes the propulsion system to cease providing electrical power to the motor when the detected AC current exceeds a second amplitude for said first interval of time, with said second amplitude being greater than the first amplitude.

23. The apparatus as set forth in claim 22 wherein the vehicle further includes a circuit breaker disposed between the supply line and the propulsion system, the EMI processor causing the circuit breaker to open and isolate the propulsion system from the supply line in the absence of the propulsion system acknowledging the EMI processor signal to cease providing electrical power to the motor.

24. The apparatus as set forth in claim 23 wherein the EMI processor causes the circuit breaker to open and isolate the propulsion system from the supply line in response to the detected AC current exceeding the second amplitude for a second interval of time, with the second interval being greater than said first interval.

25. The apparatus as set forth in claim 18 further including means for stimulating said transducer to detect current exceeding a predetermined amplitude for a predetermined interval of time.

26. The apparatus as set forth in claim 18 wherein the EMI processor monitors the output of the current transducer at a frequency corresponding to a control signal frequency for track signaling equipment utilized in conjunction with the vehicle.

27. An electrically propelled vehicle comprising:
- an electric motor for imparting motive force to the vehicle;
- a propulsion system for converting DC electrical power supplied to the vehicle via a supply line to an electrical output useable by the motor, with the electrical output provided at a first level; and
- an EMI detector including:
  - a current transducer for detecting noise on the supply line and for providing an output related thereto; and
  - a controller connected to the transducer and to the propulsion system for determining when the output of the transducer exceeds a first amplitude for a first interval of time and for signaling the propulsion system to reduce the electrical output from the first level to a second level in response thereto.

28. The vehicle as set forth in claim 27 wherein the controller monitors the output of the transducer at one or more of a predetermined frequency and a band of frequencies.

29. The vehicle as set forth in claim 27 wherein the second level is 50% of the first level.

30. The vehicle as set forth in claim 27 wherein the controller causes the propulsion system to reduce power output to 0% in response to the transducer output being in excess of a second amplitude for the first period of time, with the second amplitude greater than said first amplitude.

31. The vehicle as set forth in claim 30 further including a circuit breaker disposed between the supply line and the propulsion system and connected to the controller, with the controller causing the circuit breaker to open and isolate the propulsion system from the supply of DC electrical power in response to the output of the transducer being in excess of the second amplitude for a second interval of time, with the second interval being greater than said first interval.

32. The vehicle as set forth in claim 30 wherein the propulsion system signals the controller when output power is reduced to 0%.

33. The vehicle as set forth in claim 32 wherein the controller signals a circuit breaker to open thereby isolating the propulsion system from the supply line in the absence of receiving the signal from the propulsion system when output power is reduced to 0%.

* * * * *

UNITED STATES PATENT AND TRADEMARK OFFICE
CERTIFICATE OF CORRECTION

PATENT NO. : 5,713,541
DATED : February 3, 1998
INVENTOR(S) : William E. Schmitz et al.

It is certified that error appears in the above-identified patent and that said Letters Patent is hereby corrected as shown below:

Column 1, line 3 and
Title Page, refer to [54] line 3, "ELECTRONIC" should read --ELECTRIC--.

Title Page, under Related U.S. Application Data, delete --[63] Continuation of Ser. No. 219, Jun. 13, 1995.--.

Title Page, under [60], "Jun. 13, 1996" should read --Jun. 13, 1995.--.

Column 1 Line 3 "ELECTRONIC" should read --ELECTRIC--.

Signed and Sealed this

Thirtieth Day of June, 1998

Attest:

BRUCE LEHMAN

*Attesting Officer*                *Commissioner of Patents and Trademarks*